US012625373B2

(12) United States Patent
Masui

(10) Patent No.: US 12,625,373 B2
(45) Date of Patent: May 12, 2026

(54) MAGNIFIED OPTICAL DISPLAY ASSEMBLY

(71) Applicant: LUMILEDS LLC, San Jose, CA (US)

(72) Inventor: Hisashi Masui, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 125 days.

(21) Appl. No.: 18/658,672

(22) Filed: May 8, 2024

(65) Prior Publication Data

US 2025/0347913 A1 Nov. 13, 2025

(51) Int. Cl.
*G02B 27/01* (2006.01)
*G02B 27/00* (2006.01)
*G02B 27/02* (2006.01)

(52) U.S. Cl.
CPC ..... *G02B 27/0172* (2013.01); *G02B 27/0093* (2013.01); *G02B 27/025* (2013.01); *G02B 2027/0178* (2013.01)

(58) Field of Classification Search
CPC ........... G02B 27/0172; G02B 27/0093; G02B 27/025; G02B 2027/0178
See application file for complete search history.

(56) References Cited

U.S. PATENT DOCUMENTS

| | | | | |
|---|---|---|---|---|
| 5,625,372 A | * | 4/1997 | Hildebrand | .......... G02B 25/008 |
| | | | | 359/630 |
| 6,664,528 B1 | | 12/2003 | Cartlidge et al. | |
| 8,172,434 B1 | | 5/2012 | Olsson | |
| 10,276,091 B2 | | 4/2019 | Yoo et al. | |

| | | | | |
|---|---|---|---|---|
| 10,359,845 B1 | * | 7/2019 | Sulai | ........................ G06F 1/163 |
| 10,412,806 B2 | | 9/2019 | Chong et al. | |
| 10,748,477 B2 | | 8/2020 | Park et al. | |
| 2008/0012031 A1 | * | 1/2008 | Jang | ..................... C09K 11/565 |
| | | | | 257/89 |
| 2008/0123351 A1 | | 5/2008 | Olsson | |
| 2012/0105310 A1 | | 5/2012 | Sverdrup et al. | |
| 2015/0279934 A1 | * | 10/2015 | Tang | .................... H10K 50/115 |
| | | | | 252/301.36 |
| 2017/0261656 A1 | * | 9/2017 | Kim | ....................... G02B 5/021 |

FOREIGN PATENT DOCUMENTS

KR 20230165389 A * 12/2023

OTHER PUBLICATIONS

Machine translation of KR 20230165389 (Year: 2023).*

* cited by examiner

*Primary Examiner* — Patrick N Edouard
*Assistant Examiner* — Joseph P Fox

(57) ABSTRACT

A wearable optical display assembly includes an array of light-emitting elements arranged as a display device, and one or more optical elements arranged as a magnification system. The array is positioned at a predetermined viewing distance from an eye of a user wearing the optical display assembly. The array has an unmagnified element spacing; the magnification system forms a magnified image of the array that can be seen by the user with a magnified element spacing larger than the unmagnified element spacing. The magnified element spacing is no smaller than spatial resolution of at least a portion of the eye of the user at the predetermined viewing distance. In some instances, the magnified element spacing can subtend an angle no smaller than 1 arcminute at the predetermined viewing distance.

17 Claims, 7 Drawing Sheets

MAGNIFIED OPTICAL DISPLAY ASSEMBLY

FIELD OF THE INVENTION

The field of the present invention relates to display devices. In particular, a wearable optical display assembly is disclosed having a display with magnified element spacing no smaller than spatial resolution of an eye of a user.

SUMMARY

An inventive wearable optical display assembly includes (i) an array of light-emitting elements arranged as a display device, and (ii) one or more optical elements arranged as a magnification system. The array is characterized by an unmagnified element spacing of the light-emitting elements of the array. The optical display assembly positions the array at a predetermined viewing distance from an eye of a user wearing the optical display assembly. The magnification system is positioned and arranged to form a magnified image of the array that can be seen by the user, with the magnified image being characterized by a magnified element spacing of the light-emitting elements of the array that is larger than the unmagnified element spacing. The magnified element spacing is no smaller than spatial resolution of at least a portion of the eye of the user at the predetermined viewing distance. In some instances, the magnified element spacing can subtend an angle no smaller than 1 arcminute at the predetermined viewing distance.

Objects and advantages pertaining to wearable optical display assemblies may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. In particular, the number and density of light-emitting elements of the display device that are shown are reduced for clarity, relative to a real display device. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the inventive subject matter. The detailed description illustrates by way of example, not by way of limitation, the principles of the inventive subject matter.

Figure 1A:
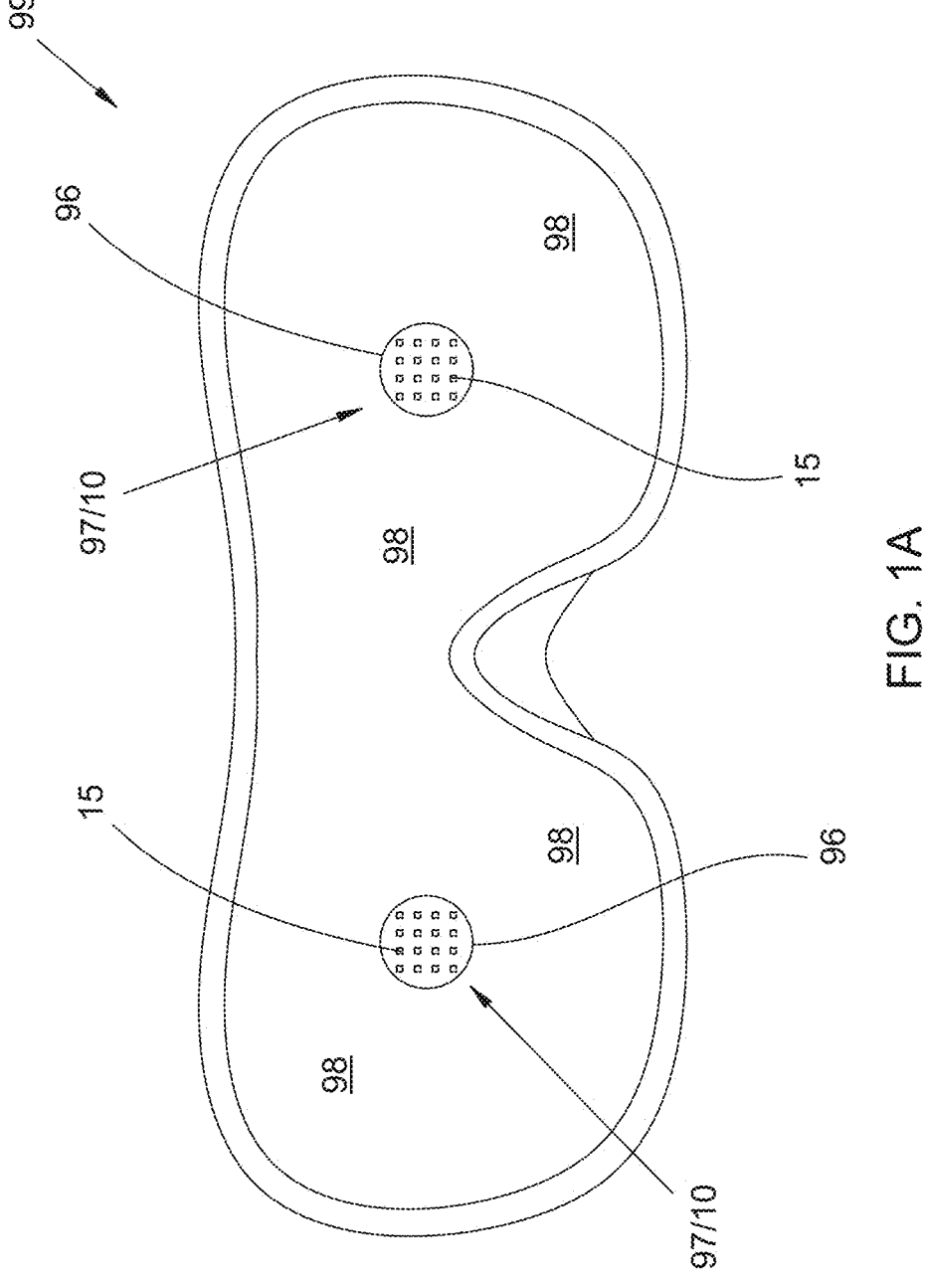
FIGS. 1A and 1B are front and side views, respectively, of an example inventive wearable optical display assembly.
Figure 1B:
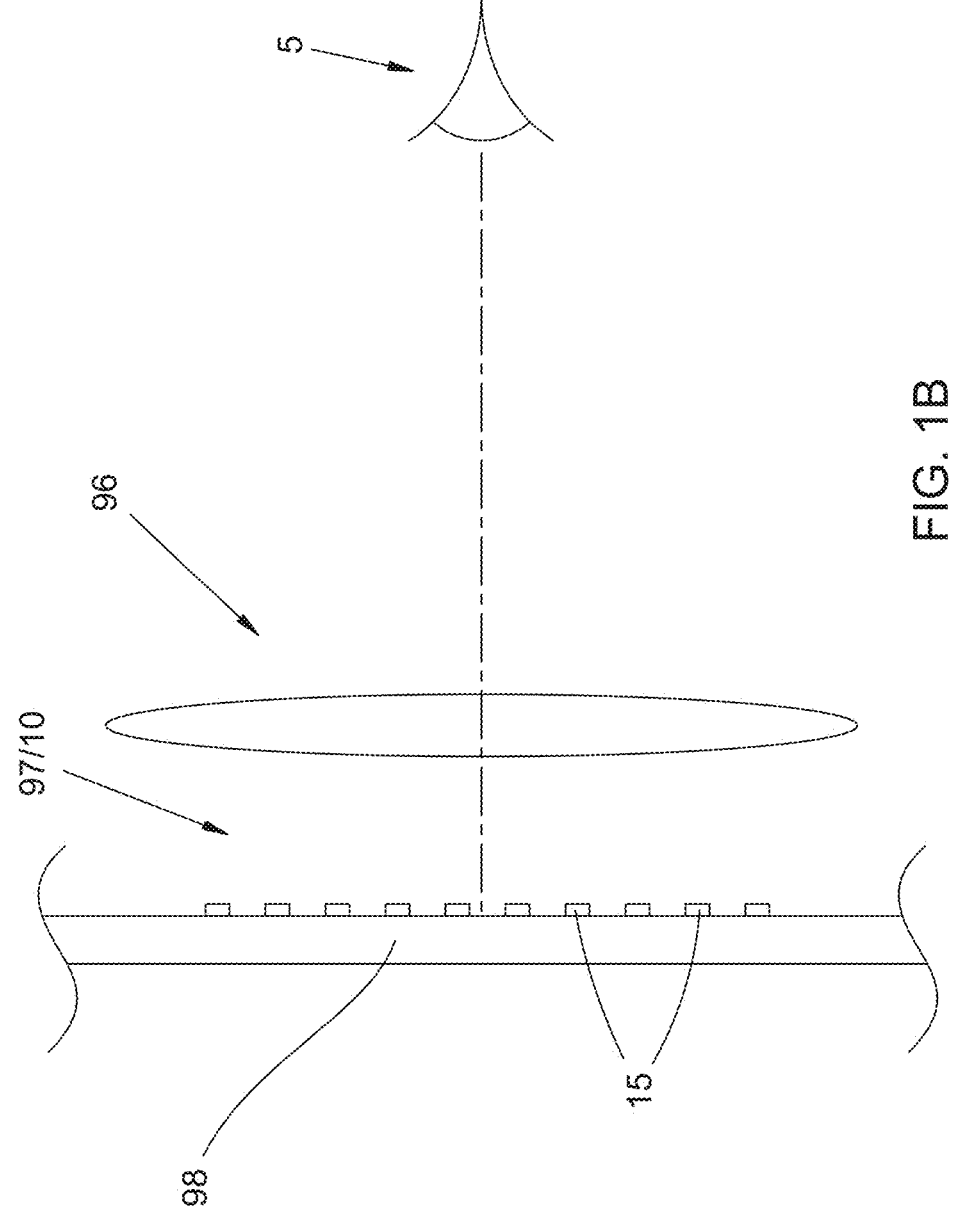

Wearable optical display assemblies are employed in, e.g., augmented reality (AR) and virtual reality (VR) systems. In some examples a wearable optical display assembly 99 can be arranged as, e.g., eyeglasses, eyewear, goggles (as in the example of FIG. 1A), a headset, a helmet, or a head-mounted device. A display device 97 can be mounted on or incorporated into at least a portion of a window, lens 98, eyepiece, display screen, faceplate, or visor of the wearable optical display assembly 99. In the example shown the display device 97 occupies a relatively small fraction of the area of the lens 98 near the center of the lens 98. In some examples the display device 97 can occupy a larger fraction of the lens 98, or the entire lens 98; in some ether examples the display device 97 might occupy a smaller fraction of the lens 98. Any suitable position of the display device 97 can be employed within the area of the lens 98.

An inventive wearable optical display assembly 99 includes (i) an array 10 of light-emitting elements 15 arranged as a display device 97, and (ii) one or more optical elements arranged as a magnification system 96. The optical display assembly 99 is structurally arranged to position the array 10 at a predetermined viewing distance from an eye 5 of a user wearing the optical display assembly 99. In some examples each light-emitting element 15 of the array 10 can comprise one or more visible-emitting light-emitting diodes (LEDs) of any suitable type or arrangement, e.g., direct-emitting or phosphor-converted, monochromic or polychromic. In some examples the LEDs can comprise semiconductor LEDs that include one or more materials among III-V, II-VI, or Group IV semiconductor materials. In some examples the light-emitting elements 15 can be integrally formed on a display substrate; in some other examples the light-emitting elements 15 can be assembled onto the display substrate.

Figure 2:
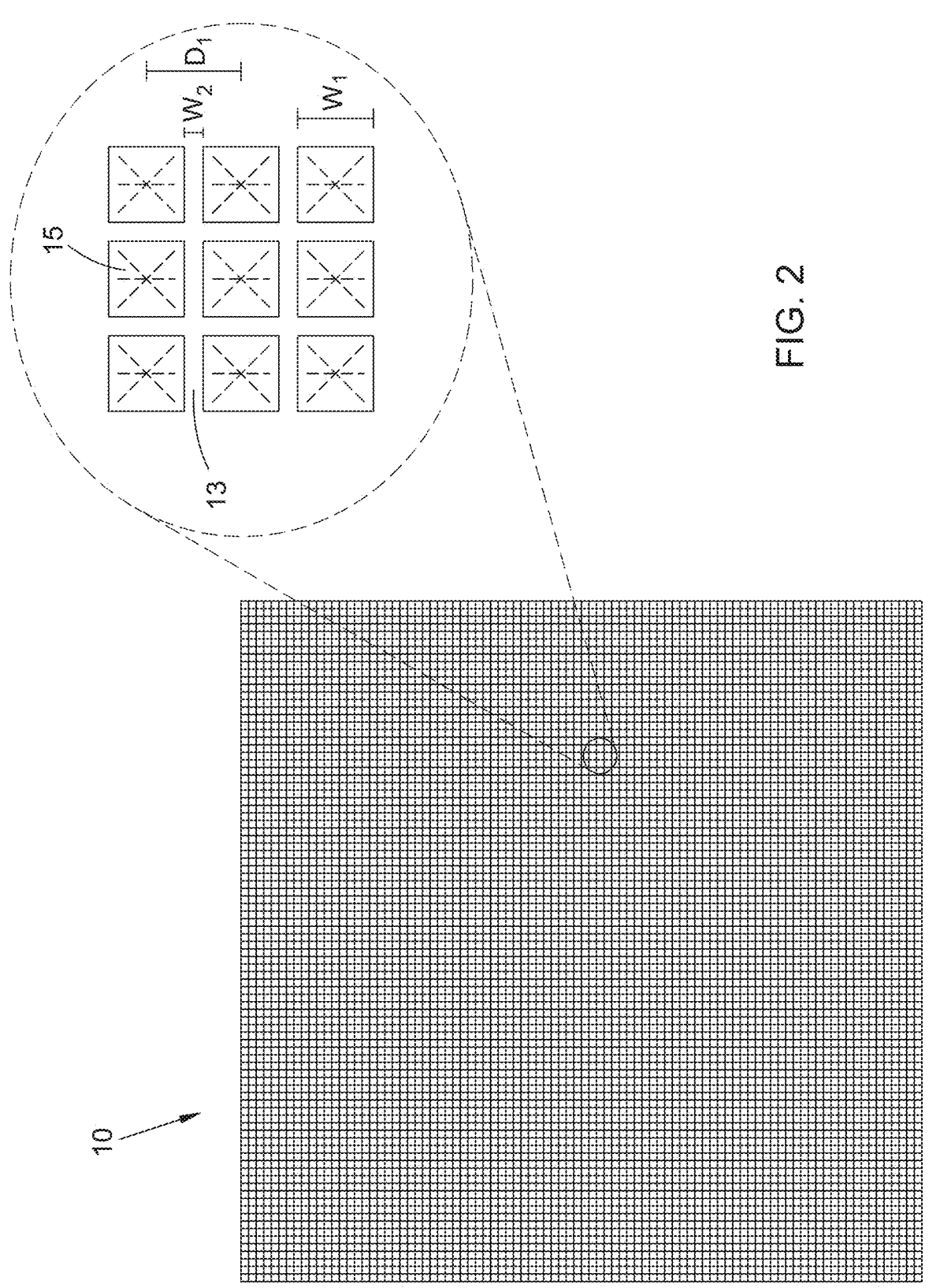
FIG. 2 illustrates schematically an array of light-emitting elements.

The array 10 can include any suitable number of individual light-emitting elements 15, e.g., on the order of $10^1$, $10^2$, $10^3$, $10^4$, $10^5$, $10^6$, or more light-emitting elements. An example of an array 10 is illustrated schematically in FIG. 2. The individual light-emitting elements 15 (also referred to as pixels) can be characterized by a device size or width $w_1$ (e.g., side lengths) in the plane of the array 10, for example, less than 200 microns, less than 100 microns, less than 50 microns, less than 20 microns, less than 10 microns, less than 5 microns, less than 2 microns, or as small as 1 micron. LEDs of such small size are often referred to as microLEDs. The light-emitting elements 15 in the array 10 can be spaced apart from each other by streets, lanes, or trenches 13 so that the array 10 can be characterized by a device separation $w_2$ in the plane of the array 10 of, for example, less than 50 microns, less than 20 microns, less than 10 microns, less than 5 microns, less than 2 microns, or less than 1 micron.

The pixel pitch or element spacing $D_1$ is the sum of $w_1$ and $w_2$, and is referred to hereinafter as the unmagnified element spacing; the pixel separation or element separation is equal to $w_2$. Although the illustrated examples show rectangular light-emitting elements 15 arranged in a rectangular array 10, the light-emitting elements and the array can have any suitable shape or arrangement, whether symmetric or asymmetric. Multiple separate arrays can be combined in any suitable arrangement in any applicable format to form a larger combined array 10 or display device 97.

Figure 3:
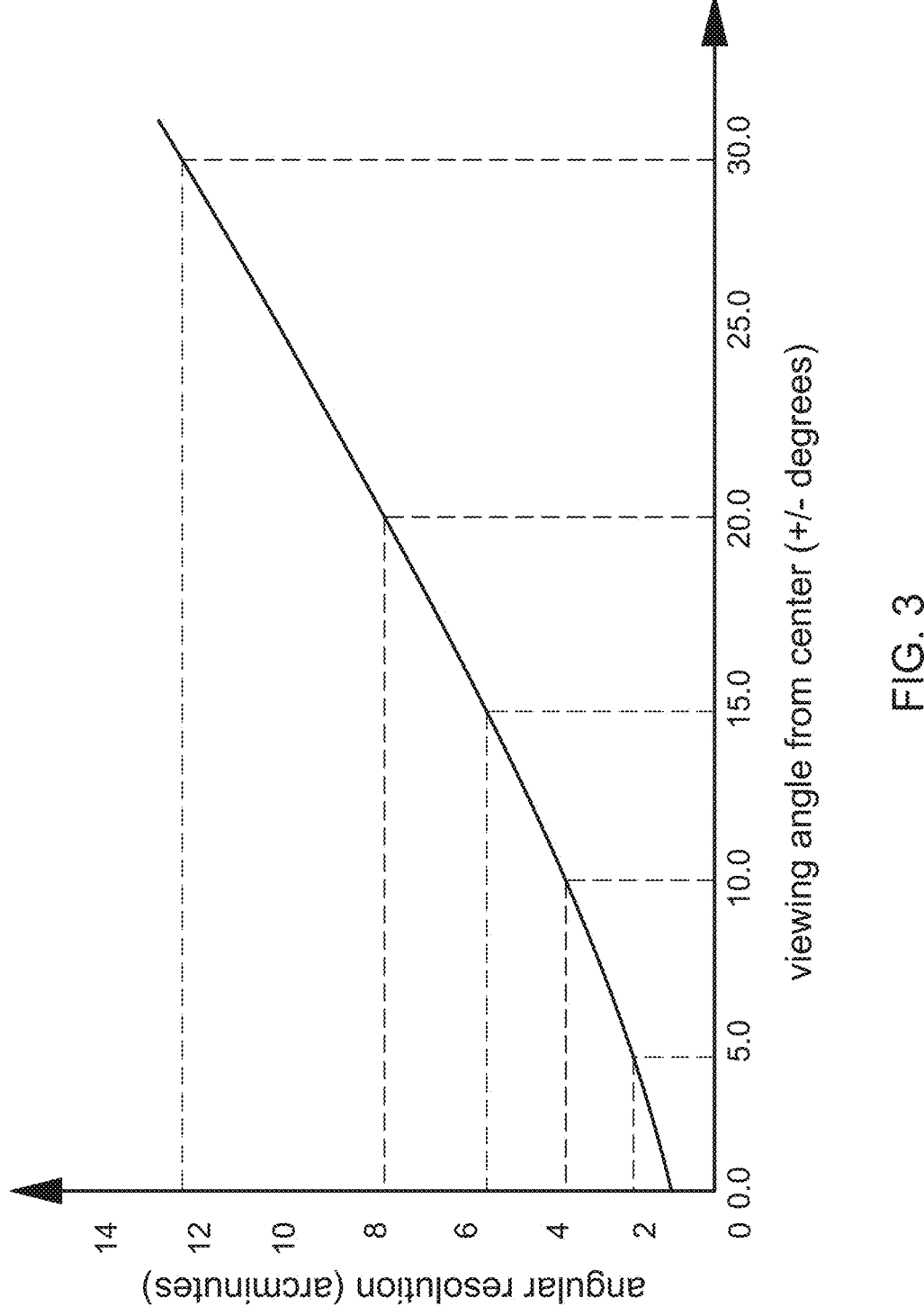
FIG. 3 shows a plot of spatial resolution of a human eye as a function of viewing angle.
Figure 4:
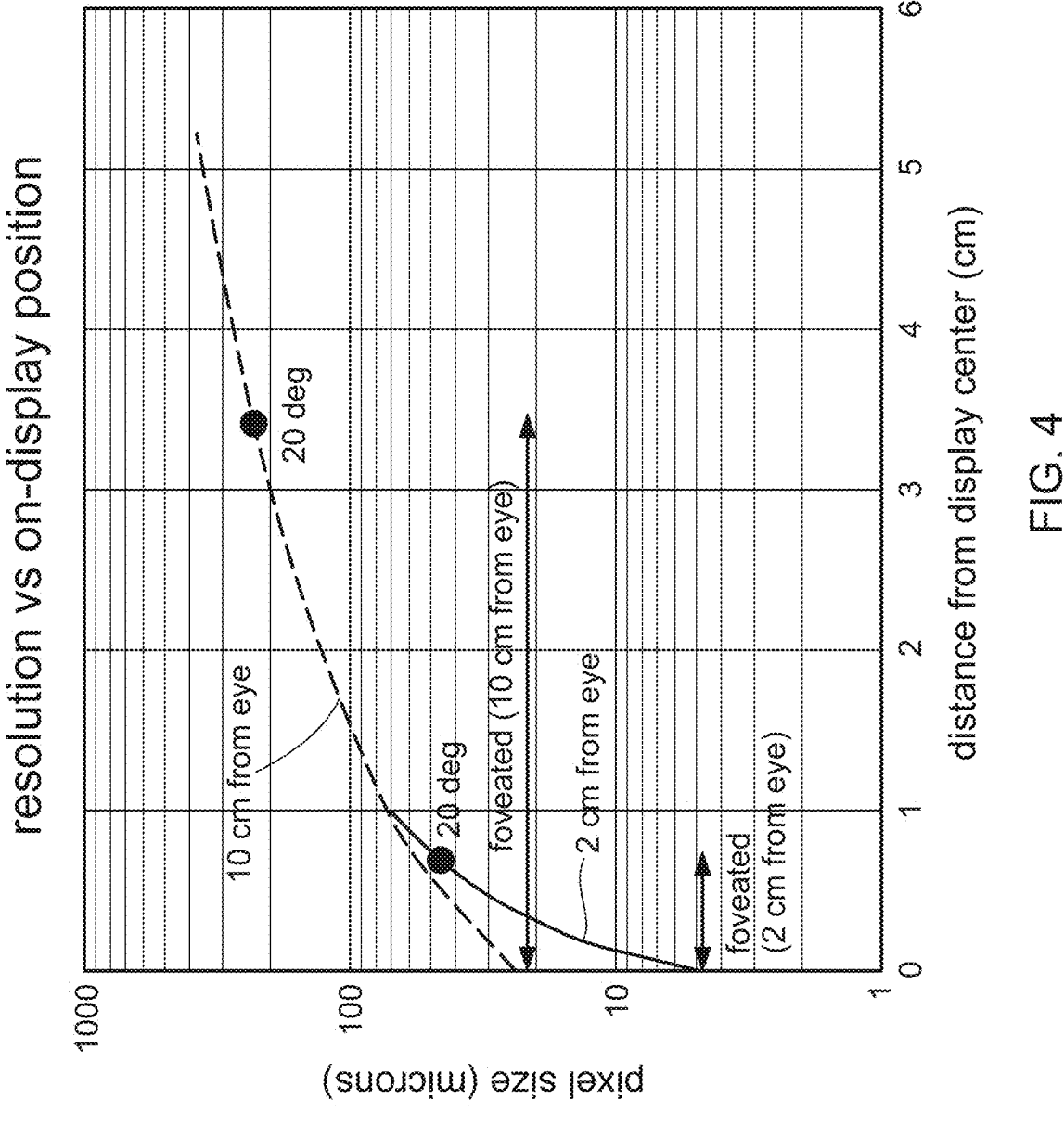
FIG. 4 shows plots of spatial resolution of a human eye as a function of transverse distance for two different viewing distances.

As illustrated in FIGS. 3 and 4, spatial resolution of the human eye is limited to about 1 arcminute at the fovea, and degrades monotonically with increasing viewing angle (e.g., 2 arcminute resolution at about a 5° viewing angle, 4 arcminute resolution at about a 10° viewing angle, and so on). The eye cannot resolve individual light-emitting elements spaced closer than its resolution limit, so the display device 97 need not exhibit an element spacing smaller than that. It would be desirable to provide a relatively large number of light-emitting elements 15 to enable more finely detailed text, graphics, or imagery to a user of the wearable optical display assembly 99, however, such a numerically large array 10 would become impracticably large spatially if limited to a minimum unmagnified element spacing $D_1$ dictated by spatial resolution of the user's eye. The magnification system 96 is positioned and arranged to form a magnified image of the array 10 that can be seen by the user. The magnified image is characterized by a magnified element spacing of the light-emitting elements of the array that is (i) larger than the unmagnified element spacing $D_1$ and (ii) no smaller than spatial resolution of at least a portion of the eye 5 of the user at the predetermined viewing distance. The magnification system 96 enables a spatially smaller but numerically larger array 10 to produce a larger image for viewing by the user, with the user's eye 5 able to perceive the full resolution of the text, graphics, or imagery shown by the display device 97.

In some examples the magnified element spacing subtends an angle no smaller than 1 arcminute at the predetermined viewing distance, roughly matching spatial resolution of the fovea of the user's eye. In some other examples the magnified element spacing can subtend larger angles. In some examples the predetermined viewing distance can be 2 cm and the magnified element spacing can be no smaller than 4 microns. In some examples the predetermined viewing distance can be 10 cm and the magnified element spacing can be no smaller than 20 microns. Other suitable combinations of viewing distance and magnified element spacing can be employed.

In some examples the magnified element spacing would be no smaller than spatial resolution of a foveal portion of the eye 5 of the user at the predetermined viewing distance (e.g., roughly 1 arcminute resolution). In some examples the display device 97 can be structured and connected to operate as a foveated display; display resolution of a foveal portion of an image on such a foveated display device 97 would be no smaller than the spatial resolution of the foveal portion of the eye 5 of the user at the predetermined viewing distance. In some of those examples, the wearable optical display assembly 99 can further include an eye-tracking system operatively coupled to the display device 97. Such an arrangement can enable movement of the foveal portion of the display in response to detected movement of the eye 5 of the user.

Figure 6:
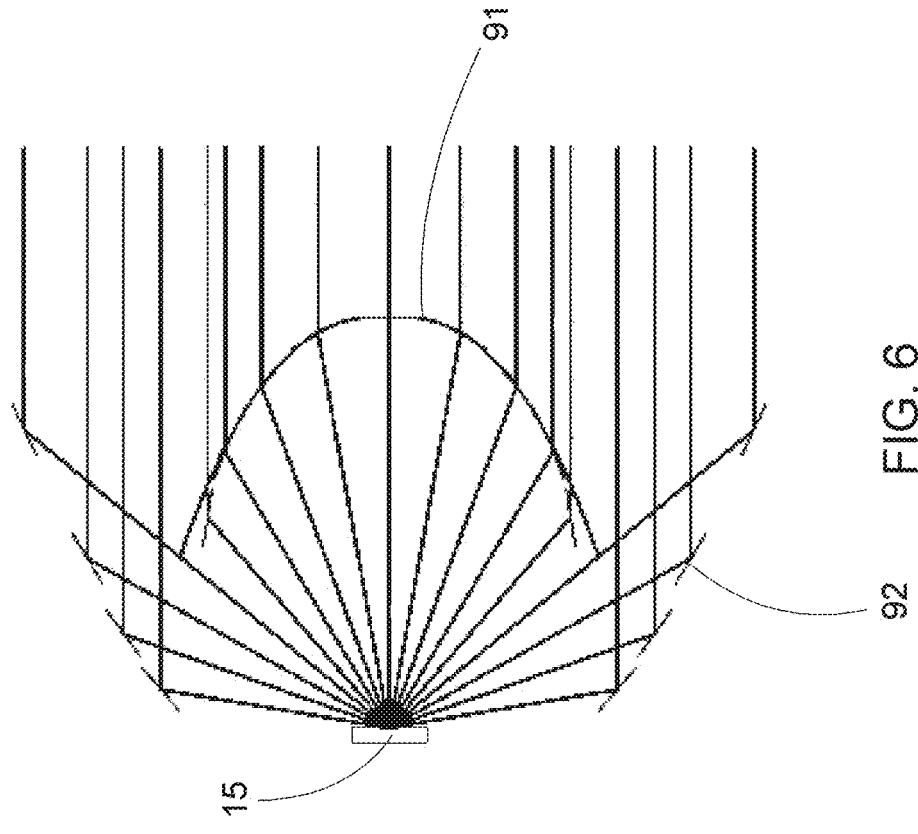
FIG. 6 illustrates schematically an example magnification system including refractive and reflective focusing optical elements.
Figure 5:
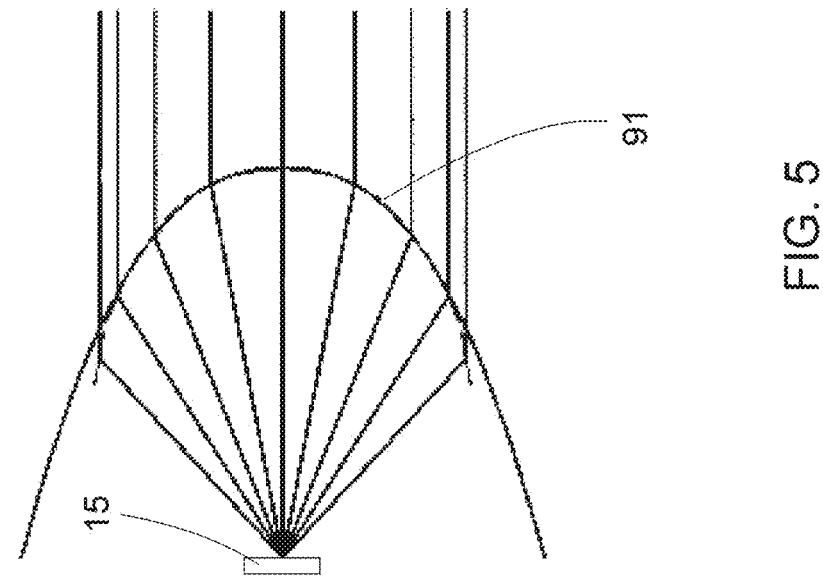
FIG. 5 illustrates schematically an example magnification system including a refractive focusing optical element.

Any suitable one or more optical elements of any suitable types or arrangements can be employed to form the magnification system 96, e.g., lenses, curved mirrors, diffractive optics, and so forth. In some examples (e.g., as in FIG. 5) one or more refractive focusing optical elements 91 can be employed (e.g., positive or negative lenses); in some examples one or more reflective optical focusing elements can be employed (e.g., concave of convex mirrors). In some examples, the magnification system 96 can include one or more refractive focusing optical elements and one or more reflective focusing optical elements; in some of those examples (e.g., as in FIG. 6), the one or more refractive focusing optical elements 91 can be arranged for collecting paraxial portions of output light from the light-emitting elements 15, and the one or more reflective focusing optical elements 92 can be arranged for collecting off-axis portions of the output light from the light-emitting elements 15. By collecting a wider range of emission angles, output efficiency of the light-emitting elements 15 can be enhanced.

Figure 7B:
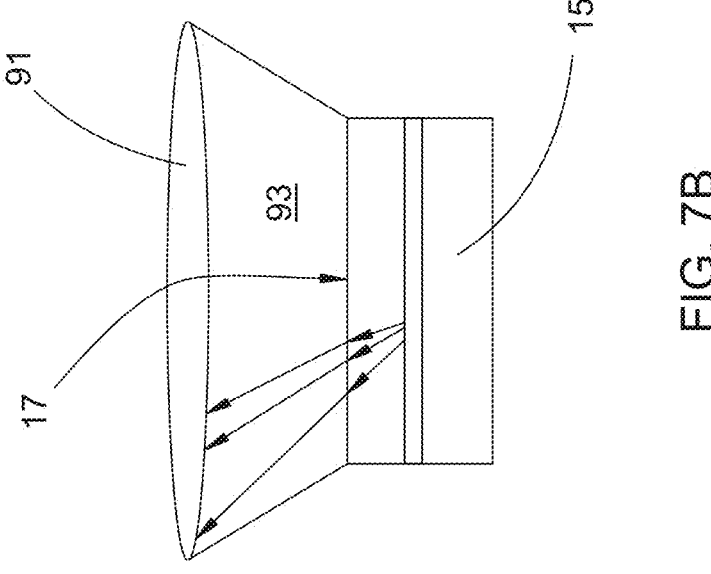
FIGS. 7A and 7B illustrate schematically space between a focusing optical element and an output surface of a light-emitting element without (FIG. 7A) and with (FIG. 7B) an immersion medium filling that space.
Figure 7A:
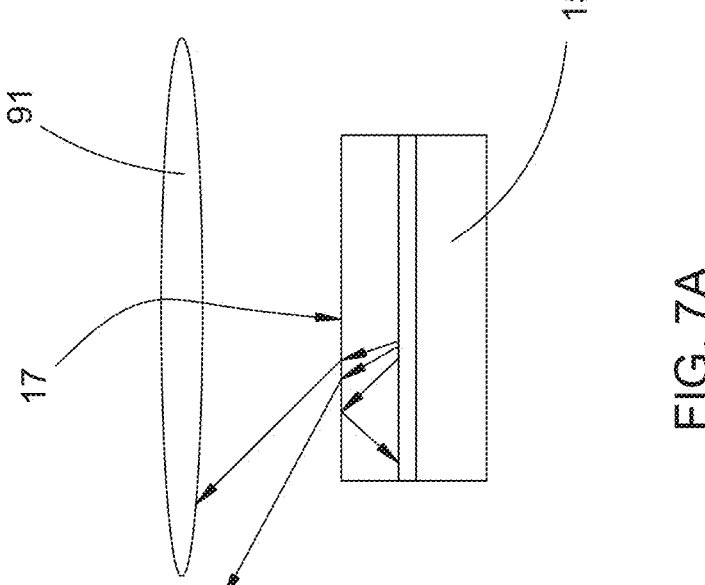

In some examples the magnification system 96 can include one or more transparent immersion media 93 in contact with light output surfaces 17 of the light-emitting elements 15. Such immersion media can enhance output efficiency of the display device 97 by reducing index contrast at the output surfaces of the light-emitting elements 15, or by reducing divergence of the output light emerging from those output surfaces 17. Such enhancement is illustrated schematically by FIG. 7A (without the immersion medium 93) and FIG. 7B (with the immersion medium 93). In some examples, at least a portion of the one or more immersion media 93 can be arranged as one or more focusing optical elements of the magnification system (e.g., a solid immersion medium 93 in contact with the output surfaces 17 and shaped as a lens 91). In some examples (e.g., as in FIG. 7B) at least a portion of the one or more immersion media 93 can fill space between the light output surfaces 17 and one or more focusing optical elements of the magnification system (e.g., lens 91). In some examples the one or more immersion media 93 can include one or more solid media; in some examples the one or more immersion media 93 can include one or more gel or liquid media. In some examples the one or more immersion media 93 can include one or more solid, gel, or liquid polymers.

In addition to the preceding, the following example embodiments fall within the scope of the present disclosure or appended claims. Any given Example below that refers to multiple preceding Examples shall be understood to refer to only those preceding Examples with which the given Example is not inconsistent, and to exclude implicitly those preceding Examples with which the given Example is inconsistent.

Example 1. A wearable optical display assembly comprising: (a) an array of light-emitting elements arranged as a display device, the array being characterized by an unmagnified element spacing of the light-emitting elements of the array, the optical display assembly being structurally arranged so as to position the array at a predetermined viewing distance from an eye of a user wearing the optical display assembly; and (b) one or more optical elements arranged as a magnification system, the magnification system being positioned and arranged so as to form a magnified image of the array that can be seen by the user, the magnified image being characterized by a magnified element spacing of the light-emitting elements of the array that is larger than the unmagnified element spacing, the magnified element spacing being no smaller than spatial resolution of at least a portion of the eye of the user at the predetermined viewing distance.

5

Example 2. The wearable optical display assembly of Example 1, the magnified element spacing subtending an angle no smaller than 1 arcminute at the predetermined viewing distance.

Example 3. The wearable optical display assembly of any one of Examples 1 or 2, the predetermined viewing distance being 2 cm and the magnified element spacing being no smaller than 4 microns.

Example 4. The wearable optical display assembly of any one of Examples 1 or 2, the predetermined viewing distance being 10 cm and the magnified element spacing being no smaller than 20 microns.

Example 5. The wearable optical display assembly of any one of Examples 1 through 4, the magnified element spacing being no smaller than spatial resolution of a foveal portion of the eye of the user at the predetermined viewing distance.

Example 6. The wearable optical display assembly of Example 5, the display device being structured and connected to operate as a foveated display with display resolution of a foveal portion of an image on the display device being no smaller than the spatial resolution of the foveal portion of the eye of the user at the predetermined viewing distance.

Example 7. The wearable optical display assembly of Example 6 further comprising an eye-tracking system operatively coupled to the display device so as to enable movement of the foveal portion of the display in response to detected movement of the eye of the user.

Example 8. The wearable optical display assembly of any one of Examples 1 through 7, the wearable optical display assembly being arranged as eyeglasses, eyewear, goggles, a headset, a helmet, or a head-mounted device, the display device being mounted on or incorporated into at least a portion of a window, lens, eyepiece, display screen, faceplate, or visor of the wearable optical display assembly.

Example 9. The wearable optical display assembly of any one of Examples 1 through 8, the magnification system including one or more transparent immersion media in contact with light output surfaces of the light-emitting elements.

Example 10. The wearable optical display assembly of Example 9, at least a portion of the one or more immersion media being arranged as one or more focusing optical elements of the magnification system.

Example 11. The wearable optical display assembly of any one of Examples 9 or 10, at least a portion of the one or more immersion media filling space between the light output surfaces and one or more focusing optical elements of the magnification system.

Example 12. The wearable optical display assembly of any one of Examples 9 through 11, the one or more immersion media including one or more solid media.

Example 13. The wearable optical display assembly of any one of Examples 9 through 11, the one or more immersion media including one or more gel or liquid media.

Example 14. The wearable optical display assembly of any one of Examples 9 through 13, the one or more immersion media including one or more solid, gel, or liquid polymers.

Example 15. The wearable optical display assembly of any one of Examples 1 through 14, the magnification system including one or more refractive focusing optical elements, one or more reflective focusing optical elements, or one or more diffractive focusing optical elements.

Example 16. The wearable optical display assembly of any one of Examples 1 through 15, the magnification system including one or more refractive focusing optical elements and one or more reflective focusing optical elements.

Example 17. The wearable optical display assembly of Example 16, the one or more refractive focusing optical elements being arranged for collecting paraxial portions of output light from the light-emitting elements, and the one or more reflective focusing optical elements being arranged for collecting off-axis portions of the output light from the light-emitting elements.

Example 18. The wearable optical display assembly of any one of Examples 1 through 17, each light-emitting element of the array comprising one or more visible-emitting, direct-emitting or phosphor-converted, semiconductor light-emitting diodes (LEDs), each LED including one or more materials among III-V, II-VI, or Group IV semiconductor materials.

Example 19. The wearable optical display assembly of any one of Examples 1 through 18, the light-emitting elements being integrally formed on, or assembled onto, a display substrate.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth, or if a differing interpretation is implicit or inherent (e.g., some small integer quantities). For null quantities described by phrases such as "equal to zero," "absent," "eliminated," "negligible," "prevented," and so forth (with or without terms such as "about," "substantially," and so forth), each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled. Terms such as "parallel," "perpendicular," "orthogonal," "flush," "aligned," and so forth shall be similarly interpreted (with or without terms such as "about," "substantially," and so forth).

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A wearable optical display assembly comprising:
an array of light-emitting elements arranged as a display device, the array being characterized by an unmagnified element spacing of the light-emitting elements of the array, the optical display assembly being structurally arranged so as to position the array at a predetermined viewing distance from an eye of a user wearing the optical display assembly; and
one or more optical elements arranged as a magnification system, the magnification system being positioned and arranged so as to form a magnified image of the array that can be seen by the user, the magnified image being characterized by a magnified element spacing of the light-emitting elements of the array that is larger than the unmagnified element spacing, the magnified element spacing being no smaller than spatial resolution of at least a portion of the eye of the user at the predetermined viewing distance,
wherein either (i) the predetermined viewing distance is 2 cm and the magnified element spacing is no smaller than 4 microns, or (ii) the predetermined viewing distance is 10 cm and the magnified element spacing is no smaller than 20 microns.

2. A wearable optical display assembly comprising:
an array of light-emitting elements arranged as a display device, the array being characterized by an unmagnified element spacing of the light-emitting elements of the array, the optical display assembly being structurally arranged so as to position the array at a predetermined viewing distance from an eye of a user wearing the optical display assembly; and
one or more optical elements arranged as a magnification system, the magnification system including one or more transparent immersion media in contact with light output surfaces of the light-emitting elements, the magnification system being positioned and arranged so as to form a magnified image of the array that can be seen by the user, the magnified image being characterized by a magnified element spacing of the light-emitting elements of the array that is larger than the unmagnified element spacing, the magnified element spacing being no smaller than spatial resolution of at least a portion of the eye of the user at the predetermined viewing distance.

3. The wearable optical display assembly of claim 2, the magnified element spacing subtending an angle no smaller than 1 arcminute at the predetermined viewing distance.

4. The wearable optical display assembly of claim 2, the magnified element spacing being no smaller than spatial resolution of a foveal portion of the eye of the user at the predetermined viewing distance.

5. The wearable optical display assembly of claim 4, the display device being structured and connected to operate as a foveated display with display resolution of a foveal portion of an image on the display device being no smaller than the spatial resolution of the foveal portion of the eye of the user at the predetermined viewing distance.

6. The wearable optical display assembly of claim 5 further comprising an eye-tracking system operatively coupled to the display device so as to enable movement of the foveal portion of the display in response to detected movement of the eye of the user.

7. The wearable optical display assembly of claim 2, the wearable optical display assembly being arranged as eyeglasses, eyewear, goggles, a headset, a helmet, or a head-mounted device, the display device being mounted on or incorporated into at least a portion of a window, lens, eyepiece, display screen, faceplate, or visor of the wearable optical display assembly.

8. The wearable optical display assembly of claim 2, at least a portion of the one or more immersion media being arranged as one or more focusing optical elements of the magnification system.

9. The wearable optical display assembly of claim 2, at least a portion of the one or more immersion media filling space between the light output surfaces and one or more focusing optical elements of the magnification system.

10. The wearable optical display assembly of claim 2, the one or more immersion media including one or more solid media.

11. The wearable optical display assembly of claim 2, the one or more immersion media including one or more gel or liquid media.

12. The wearable optical display assembly of claim 2, the one or more immersion media including one or more solid, gel, or liquid polymers.

13. The wearable optical display assembly of claim 2, the magnification system including one or more refractive focusing optical elements, one or more reflective focusing optical elements, or one or more diffractive focusing optical elements.

14. The wearable optical display assembly of claim 2, the magnification system including one or more refractive focusing optical elements and one or more reflective focusing optical elements.

15. A wearable optical display assembly comprising:

an array of light-emitting elements arranged as a display device, the array being characterized by an unmagnified element spacing of the light-emitting elements of the array, the optical display assembly being structurally arranged so as to position the array at a predetermined viewing distance from an eye of a user wearing the optical display assembly; and one or more optical elements arranged as a magnification system, the magnification system including one or more refractive focusing optical elements and one or more reflective focusing optical elements and being positioned and arranged so as to form a magnified image of the array that can be seen by the user, the magnified image being characterized by a magnified element spacing of the light-emitting elements of the array that is larger than the unmagnified element spacing, the magnified element spacing being no smaller than spatial resolution of at least a portion of the eye of the user at the predetermined viewing distance, the one or more refractive focusing optical elements being arranged for collecting paraxial portions of output light from the light-emitting elements, and the one or more reflective focusing optical elements being arranged for collecting off-axis portions of the output light from the light-emitting elements.

16. The wearable optical display assembly of claim 2, each light-emitting element of the array comprising one or more visible-emitting, direct-emitting or phosphor-converted, semiconductor light-emitting diodes (LEDs), each LED including one or more materials among III-V, II-VI, or Group IV semiconductor materials.

17. The wearable optical display assembly of claim 2, the light-emitting elements being integrally formed on, or assembled onto, a display substrate.

* * * * *